UNITED STATES PATENT OFFICE.

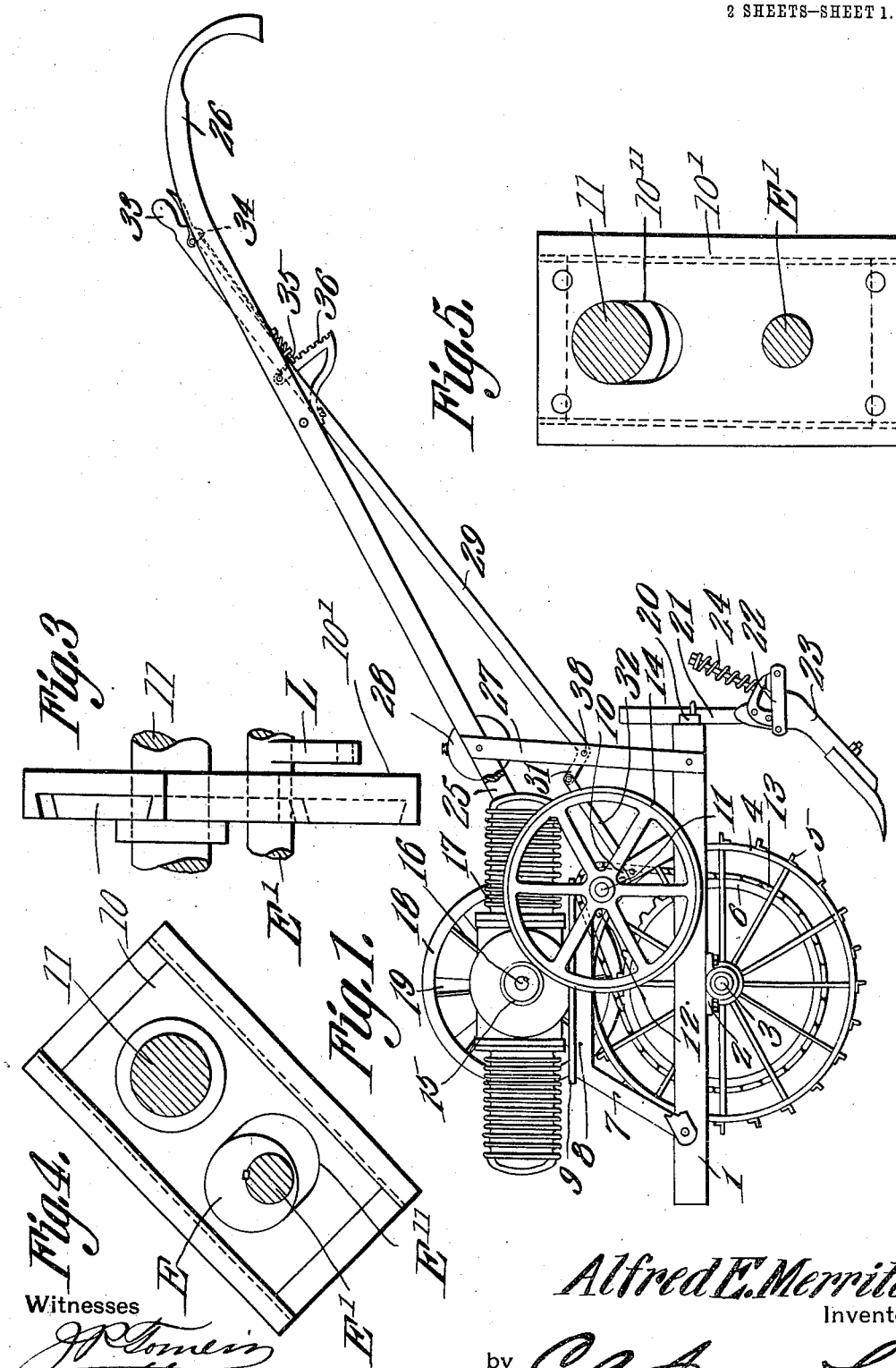
A. E. MERRITT.
AGRICULTURAL IMPLEMENT.
APPLICATION FILED JULY 27, 1911.
1,034,481.
Patented Aug. 6, 1912.
2 SHEETS—SHEET 1.
Witnesses
Alfred E. Merritt,
Inventor
by C. A. Snow & Co.
Attorneys

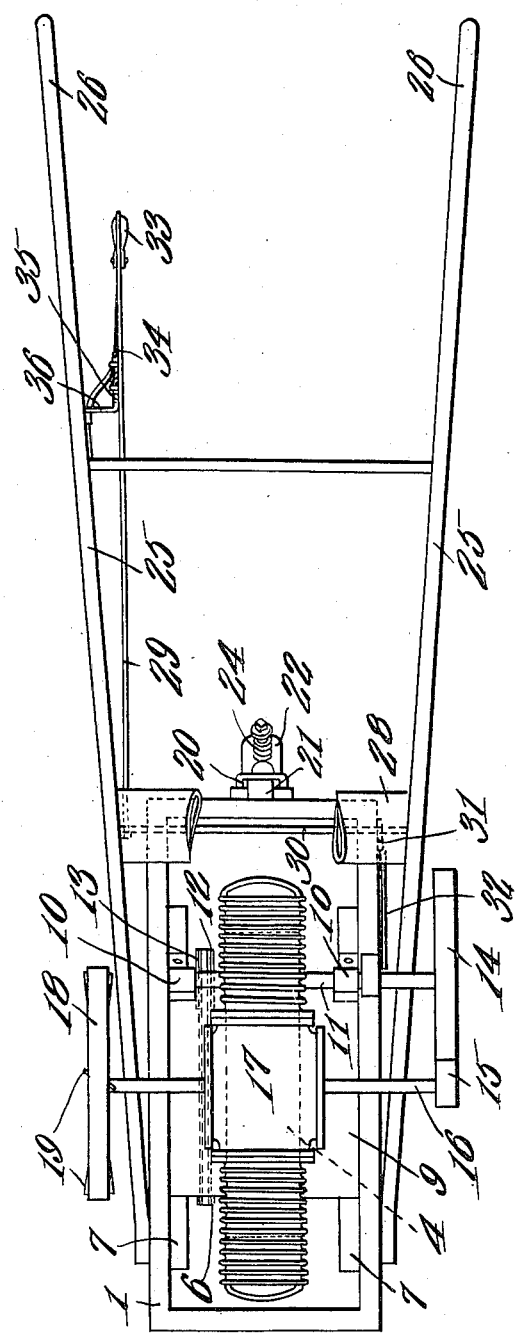

ALFRED E. MERRITT, OF GAINESVILLE, GEORGIA.

AGRICULTURAL IMPLEMENT.

1,034,481.  Specification of Letters Patent.  Patented Aug. 6, 1912.

Application filed July 27, 1911. Serial No. 640,918.

*To all whom it may concern:*

Be it known that I, ALFRED E. MERRITT, a citizen of the United States, residing at Gainesville, in the county of Hall and State of Georgia, have invented a new and useful Agricultural Implement, of which the following is a specification.

This invention relates to improvements in agricultural implements, the primary object of the invention being the provision of a hand guided and motor driven agricultural implement, the said implement being provided with traction means and manually operated means disposed in operable relation with the handle of the implement for connecting and disconnecting an explosive motor with said traction wheels to propel the said implement which may carry plow points, cultivator teeth or in fact any portion or apparatus for agricultural purposes.

A further object of this invention is the provision of a frame mounted upon traction wheels and provided with guiding handles and carrying an explosive motor with manually operated means for connecting the traction wheel of the explosive motor to propel the apparatus as desired.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of the apparatus, a portion of the handle being broken away. Fig. 2 is a top plan view thereof. Figs. 3, 4 and 5 are detail views illustrating the eccentric connection whereby the traction wheels of the implement are operably connected to the motor.

Referring to the drawings, the numeral 1 designates the frame of the implement which has connected to the underside thereof at opposite points journal boxes 2 for the reception of the axle 3, carrying the traction wheel 4, said traction wheel being provided with earth-engaging flanges or cleats 5 upon the tire or periphery thereof.

Secured to and supported by the frame 1 and straddling the axle of the machine is a frame 7, the upper portion 8 has mounted thereon, the motor bed or platform 9, while slidingly mounted and eccentrically operated are the boxes 10 for the reception of the axle or shaft 11 mounted transversely of the machine and carrying at one end within the frame a small sprocket wheel 12, which receives and transmits motion to a large sprocket 6 carried by the wheel 4 or the axle 3 through the medium of the sprocket chain 13.

The boxings 10 as clearly shown in detail in Figs. 3, 4 and 5 are mounted for sliding movement within the guides 10' carried by the frame of the implement. In this case the shaft 11 is journaled in the respective boxings and passes through the elongated slot 10'' formed in the respective plates 10', while the shaft E' is journaled for oscillation within the respective plates 10' and carries the eccentric E which is movable within the elongated slot E'', said slot E'' being disposed at right angles to the slot 10'' so that when the shaft E' is oscillated by the lever L through the manually operated connections to be hereinafter set forth, the respective boxings 10 are moved so as to bring the friction wheel 14 into and out of engagement with the small friction wheel 15 carried upon the end of the motor shaft 16.

Mounted upon one end of the shaft 11 is a friction wheel 14 whose surface is a friction surface and is adapted to be moved into and out of contact with the small friction wheel 15 carried upon the end of the motor shaft 16 which is operably connected to the motor 17 mounted upon the bed or plate 9 and having its shaft 16 directly above and in line with the axle 3 of the implement. Mounted upon the other end of the shaft 16 is a fly wheel 18, provided with the fan blades 19 whereby the motor or engine is cooled. The engine or motor 17 is preferably of the explosive type, and is operated with the usual carbureter and ignition devices (not shown). Mounted in the rear of the frame 1 are the cleats or clamps 20 carrying the vertical arms 21 at whose lower ends are the straps 22 supporting the cultivator point carrying arms 23 and the spring 24, whereby the said arm 23 is cushionedly supported and by means of which the same is not given a jerky action upon the earth which is generally caused by the vibration of the motor 17 during the operation of the same.

Secured to the side of the frame 1 and inclining rearwardly therefrom are the two handles 25 provided with the guiding ends 26, said handles being supported intermediate their ends by means of the vertical braces or rods 27 connected to the rear ends of the frame 1. Disposed between the said handles at their point of engagement with the braces or rods 27 is a gasolene container or tank 28, which is operably connected for supplying gasolene to the motor 17.

In order to operate the large friction wheel 14 into and out of contact with the rotating friction disk 15 carried by the shaft 16 of the motor, the lever 29 is provided and is pivoted upon the shaft 38 between the braces 27 and has its lower or short arm 31 connected through the link 32 to an eccentric which is operably connected with the boxes 10 so that the shaft 11 and the large friction wheel 14 is moved into and out of engagement with the periphery of the friction disk 15. In order to operate the lever 29, the operating end 33 is disposed in operative relation to the guiding handles 26, the said lever 23 being provided with the locking device 34 carrying the locking pawl 35, adapted to engage the rack 36 connected with one of the handles.

From the foregoing description taken in connection with the drawings, it is evident that the explosive motor 17 though operating at a fixed speed may be caused to operate through its small friction wheel 15 and the large friction wheel 14, with the traction wheel 4, thereby propelling the implement at the desired speed, said implement being guided by means of the handles 26 by the operator of the implement and at will, it only being necessary to operate the lever 29 to cause power to be transmitted from the explosive motor 17 to the traction wheel 4.

It is evident that many forms and devices may be connected to the frame 1 and the same may be used as a plow, cultivator, a planter, and a fertilizer distributer, it simply being necessary to substitute these mechanisms for the cultivator tooth shown in the drawings.

What is claimed is:

1. In an agricultural implement, the combination of a frame, an axle mounted transversely and centrally thereof, an auxiliary frame carried by said frame, a traction wheel carried by said axle, an explosive motor mounted upon said auxiliary frame, and having its shaft above and in line with the axle of the machine, a sprocket wheel operably connected with the traction wheel, another shaft slidingly mounted upon the auxiliary frame, a sprocket wheel carried thereby, a sprocket chain connecting both of said sprocket wheels, a friction wheel carried upon the end of the engine shaft, another friction wheel carried upon the end of said sliding shaft, and means for operating the sliding shaft to connect and disconnect said friction wheels.

2. In an agricultural implement, the combination of a frame, an axle mounted transversely and centrally thereof, an auxiliary frame carried by said frame, a traction wheel carried by said axle, an explosive motor mounted upon said auxiliary frame and having its shaft above and in line with the axle of the machine, a sprocket wheel operably connected with the traction wheel, another shaft slidingly mounted upon the auxiliary frame, a sprocket wheel carried thereby, a sprocket chain connecting both of said sprocket wheels, a friction wheel carried upon the end of the engine shaft, another friction wheel carried upon the end of said sliding shaft, means for operating the sliding shaft to connect and disconnect the friction wheels, and a pair of guiding handles connected to said frame.

3. In an agricultural implement, the combination of a frame, an axle mounted centrally and transversely thereof, a traction wheel mounted thereon, an auxiliary frame carried by the main frame, a bed carried by the upper end of said auxiliary frame, an explosive motor mounted on said bed and having its shaft above and in line with the axle of the machine, a friction wheel carried upon one end of said shaft, a fly wheel upon the other end, a shaft slidably mounted upon the auxiliary frame, means for operably connecting said shaft with the traction wheel, a friction wheel carried by said sliding shaft and disposed in operable relation to the friction wheel of the motor, a pair of handles connected to the frame for guiding the implement, a lever pivoted to the frame and having its outer end in operable relation to the handles, and means for connecting its lower end to the sliding shaft.

In testimony that I claim the foregoing as my own, I have hereto affixed my signature in the presence of two witnesses.

ALFRED E. MERRITT.

Witnesses:
C. W. MERRITT,
J. F. MOOREFIELD.